United States Patent [19]

Katsuma et al.

[11] Patent Number: 4,953,958
[45] Date of Patent: Sep. 4, 1990

[54] VARIABLE MAGNIFICATION DUPLICATOR LENS SYSTEM

[75] Inventors: Toshiaki Katsuma; Nagayoshi Hirano, both of Omiya, Japan

[73] Assignee: Fuji Photo Optical Co., Ltd., Omiya, Japan

[21] Appl. No.: 289,379

[22] Filed: Dec. 23, 1988

[30] Foreign Application Priority Data

Jan. 14, 1988 [JP] Japan .................................. 63-6623

[51] Int. Cl.$^5$ ............................................. G02B 15/00
[52] U.S. Cl. ...................................... 350/425; 350/423
[58] Field of Search ............... 350/423, 427, 425, 463, 350/464

[56] References Cited

U.S. PATENT DOCUMENTS 4,812,021 3/1989 Harrigan .............................. 350/425

FOREIGN PATENT DOCUMENTS 2750571 5/1978 Fed. Rep. of Germany ...... 350/425

*Primary Examiner*—P. M. Dzierzynski
*Attorney, Agent, or Firm*—Oblon, Spivak, McClelland, Maier & Neustadt

[57] ABSTRACT

Described herein is a variable magnification duplicator lens system which is provided with, on the subject side of a stop, a front lens group including a 1st lens element consisting of a meniscus lens of positive power and facing the convex side thereof toward the subject, a 2nd lens element consisting of a meniscus lens of negative power facing the convex side thereof toward the subject, a 3rd lens element with positive power, and a 4th lens element with negative power, and on the image-forming side of the stop, a rear lens group including 5th, 6th, 7th, and 8th lens elements arranged symmetrically with the 1st to 4th lens elements of the front lens group, respectively. Of these lens elements, the 3rd to 6th lens elements and at least one of the 1st and 8th lens elements are movable. When shifting the whole lens system in the direction of the optical axis to vary the duplication scale, a reduced scale position is assumed by a lens position adjustment shifting the 5th and 6th lens elements into positions closer to the stop while at least shifting the 8th lens element toward the 7th lens element or shifting the 1st lens element away from the 2nd lens element, and an enlarged scale position is assumed by a lens position adjustment shifting the 3rd and 4th lens elements closer to the stop while at least shifting the 1st lens element toward the 2nd lens element or shifting the 8th lens elements away from the 7th lens element.

5 Claims, 12 Drawing Sheets

COMA ABERRATION

SPHERICAL ABERRATION    ASTIGMATISM    DISTORTION

Fig. 8

COMA ABERRATION

— ⟨e⟩
—·— ⟨g⟩
—··— ⟨c⟩

SPHERICAL ABERRATION  ASTIGMATISM  DISTORTION

Fig. 9

COMA ABERRATION

SPHERICAL ABERRATION   ASTIGMATISM   DISTORTION

COMA ABERRATION

— ⟨e⟩
—·— ⟨g⟩
—··— ⟨c⟩

SPHERICAL ABERRATION  ASTIGMATISM  DISTORTION

Fig. 12

COMA ABERRATION

SPHERICAL ABERRATION    ASTIGMATISM    DISTORTION

VARIABLE MAGNIFICATION DUPLICATOR LENS SYSTEM

BACKGROUND OF THE INVENTION

1. Field of the Invention

This invention relates to a variable magnification lens system to be used on copying machines, and more particularly to a variable magnification duplicator lens system which is improved in copying performance quality over a wide magnification range.

2. Description of the Prior Art

The duplicator lens systems are generally required to meet the following conditions.

(1) For imaging a flat subject (an original) on a flat surface, the lens system is desired to have, along with uniform image resolution over the entire field area, good image surface characteristics holding the field curvature and astigmatism to the minimum;

(2) The aperture efficiency should be 100% to suppress drops in light amount in peripheral portions of the field area:

(3) The lens system should be compact and have a wide angle of field to meet the demands for compact and small-size copying machines;

(4) The distortion should be ignorably small;

(5) The contrast for CTF or modulation for MTF should be high enough over the entire variable magnification range, especially, in the low frequency range;

(6) The lens system should have a large aperture in terms of light passing power to permit high speed copying operations; and (7) The system should be composed of a minimum number of lens elements of inexpensive glass material.

Considering that recent copying machine specifications generally include enlarged- and reduced-scale copying functions. In such a magnified duplication, the lens system should satisfy the above-stated requirements.

In order to avoid deteriorations in performance quality in reduced- and enlarged-scale copying operations, it has been known to change the copy scale without varying the distance from an original surface to a sensitive material surface as described, for example, in U.S. Pat. No. 3,865,470 using the so-called zoom lens unit. However, in consideration of the problems which are encountered in case of the zoom lens with a complicated scale varying mechanism, namely, the problems such as increase of the unit size, difficulties of making designs for high performances, increase in cost etc., it has been the general practice to use, instead of a zoom lens unit, a fixed focal point lens unit on ordinary copying machines for office use. In addition, where a fixed focal point lens is used, the so-called symmetrical lens system which has the lens elements arranged symmetrically relative to a stop is employed in most cases to prevent distortion and lateral chromatic aberrations in the position of the natural or equivalent scale which is regarded as a reference scale.

Figure 13:
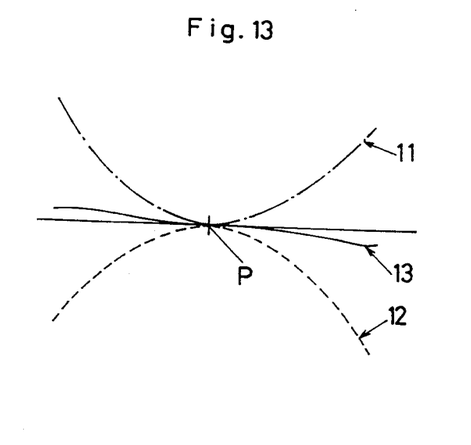
FIG. 13 is a diagram explaining the coma aberration of a conventional symmetrical lens unit in natural or equivalent scale position.

In a symmetrical lens system of this sort, the lens groups on the opposite sides of a stop are inverse to each other in refractive action. Accordingly, as clear from FIG. 13 which explains coma aberrations of a typical symmetrical lens system in equivalent scale position, the coma aberrations of the system as a whole can be corrected by making an adjustment such that the simple coma aberration 11 which is produced by overcorrection of a front lens group on the front side of a stop becomes substantially symmetric relative to the principal light ray P to offset same by the undercorrective coma aberration 12 which is produced by a rear lens group subtantially symmetrically relative to the principal light ray P.

In case of a fixed focal point lens unit, its position has to be shifted for a magnified duplication, i.e., toward the original surface (for duplication on an enlarged scale) and toward the sensitive material) for duplication on a reduced scale).

Figure 14:
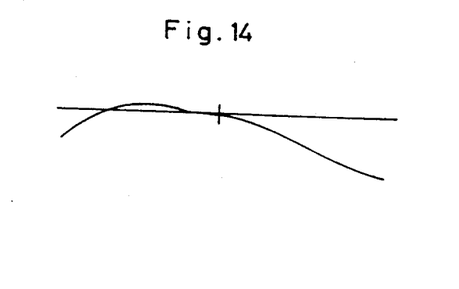
FIG. 14 is a diagram showing the trend of coma aberration in reduced scale position maintaining the same axial space lengths as in the equivalent scale position.

In reduced scale position, the upper light rays above the principal light ray pass through the front lens system close to its optical axis without undergoing strong refractive action of the front lens system, but as they pass through the rear lens system at a position away from its optical axis they undergo its strong converging action, producing undercorrective coma aberration. On the other hand, the lower light rays have a smaller angle of incidence to the front lens system than in the equivalent scale position, and therefore undergo the refraction by the lens system in a weakened degree, producing undercorrective coma aberration as shown in FIG. 14 and exhibiting considerable deteriorations especially in tangential coma aberration.

Figure 15:
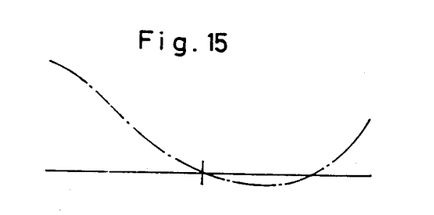
FIG. 15 is a diagram showing the trend of coma aberration in enlarged scaled position maintaining the same axial space lengths as in the equivalent scale position.

In enlarged scale position, the upper light rays above the principal ligh ray P of the rear lens system undergo weakly converging refractive action, changing from undercorrective coma aberration to somewhat overcorrective coma aberration. The lower light rays undergo strong converging action as the angle of incidence to the front lens system is increased as compared with that of the equivalent scale position, producing overcorrective coma aberration and as a whole resulting in overcorrective coma aberration as shown in FIG. 15.

Recently, copying machines are usually required to have a function of copy magnification over a broad range. When the range of magnification for copy scale reduction and enlargement is broadened, however, it becomes difficult to prevent deteriorations in lens performance quality. Especially, in case of a large-size copying machine intended for originals of 36 inches or greater in size, it becomes necessary to lengthen the focal length in order to widen the field angle in equivalent scale position to 50° or greater for compactness of the machine. In the event of the focal length being increased in this way and adopting a design with a focal length set at 1.0 as a standard, even if the chromatic aberration in magnified scale position is of an ignorable degree in the standardized condition, it is likely that the aberration is multiplied according to the actual focal length in case of a full size unit of actual specifications, as a result of deteriorations in MTF of the unit.

Therefore, in order to correct the lateral chromatic aberration to a small amount which is practically ignorable even at a focal length as adopted in specifications, it has been necessary to use for the lens elements a costly glass material of extraordinary dispersion or to increase the number of lens elements, which is invariably reflected by increase in cost or in size of the lens system. Consequently, it is the general practice to prevent the deteriorations in lens performance in enlarging and reducing scale positions either by limiting the copy magnification to a narrow range where the performance quality is practically acceptable or by sacrificing the brightness or high light transmitting power of the lens or by restricting the angle of field.

SUMMARY OF THE INVENTION

Under these circumstances, the present invention has as its primary object the provision of a variable magnification duplicator lens system which can maintain satisfactory lens performance over a wide range of copy scale reduction and enlargement.

It is another object of the invention to provide a variable scale duplicator lens system which can effectively correct coma aberration and lateral chromatic aberration which occur at the time of reduction and enlargement of the copy scale.

It is still another object of the invention to provide a variable scale duplicator lens system which permits to correct aberrations by the use of a reduced number of lens elements without resorting to costly glass material and which is capable of duplication of a wide field angle with a relatively long focal length.

It is a further object of the invention to provide a variable scale duplicator lens system which can effect correction of aberrations by the use of a simple mechanism.

In accordance with the present invention, the above-mentioned objects are achieved by a variable magnification duplicator lens system which comprises:

front and rear lens groups each consisting of four lens elements and located on the opposite sides of a stop, one on the side of the subject and the other on the image-forming side;

the front lens group on the subject side of the stop including a 1st lens element consisting of a meniscus lens having positive power and facing the convex side thereof toward the subject, a 2nd lens element consisting of a meniscus lens having negative power and facing the convex side thereof toward the subject, a 3rd lens element having positive power and a 4th lens element having negative power;

the rear lens group on the image-forming side of the stop including 5th to 8th lens elements arranged symmetrically with the 1st to 4th lens elements of the front lens group, respectively;

of the above-mentioned lens elements, the 3rd, 4th, 5th and 6th lens elements and at least one of the 1st and 8th lens elements being movable;

the lens system being moved as a whole in the direction of the optical axis at the time of varying the copy scale;

in reduced scale position, the lens position being adjusted by shifting together the 5th and 6th lens elements into positions closer to the stop while at least shifting the 8th lens element toward the 7th lens element and/or shifting the 1st lens element away from the 2nd lens element; and in enlarged scale position, the lens position being adjusted by shifting together the 3rd and 4th lens elements into positions closer to the stop while at least shifting the 1st lens element toward the 2nd lens element and/or shifting the 8th lens element away from the 7th lens element.

The above and other objects, features and advantages of the invention will become apparent from the following particular description of the invention, taken in conjunction with the accompanying drawings.

BRIEF DESCRIPTION OF THE DRAWINGS

In the accompanying drawings.

PARTICULAR DESCRIPTION OF THE INVENTION

Figure 1:
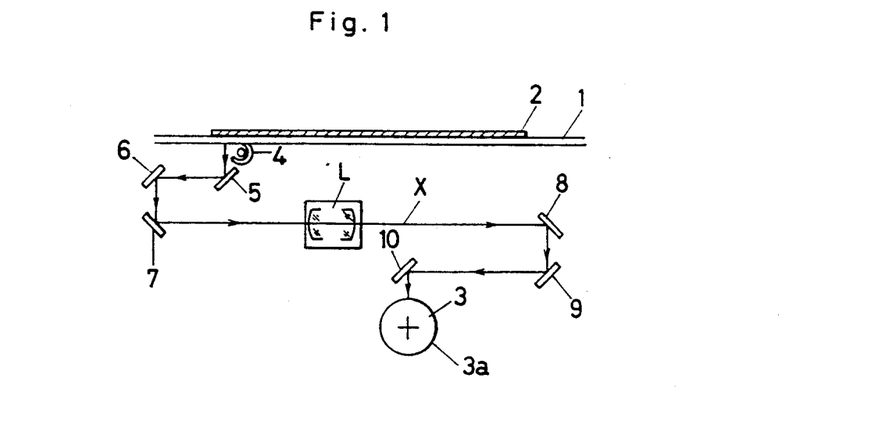
FIG. 1 is a diagrammatic illustration of the general arrangement of duplicator optical system.

Referring first to FIG. 1, indicated at 1 is an original mount surface, at 2 is an original which is set on the original mount surface 1, at 3 is a photosensitive drum with a sensitive surface 3a on its circumference, and at 4 is a light source. Provided in the light path X leading from the original surface 1 to the sensitive surface 3a are six mirrors 5 to 10 which serve to bend the light path at right angles. A duplicator lens system L is interposed between the 3rd and the 4th mirrors 7 and 8.

For making copies on enlarged and reduced scales by the use of the above-described duplicator optical system, the duplicator lens system L is shifted in the direction of its optical axis while holding the original mount surface 1 and the sensitive surface 3a stationary. In order to correct the variations which occur in the conjugate distances as a result of a change of magnification rate, either the 2nd mirror 6 and the 3rd mirror 7 are shifted integrally in the direction of the optical axis, or the 4th mirror 8 and the 5th mirror 9 are shifted integrally in the direction of the optical axis. At this time, the relationship between the displacement of the lens system L and the displacement of the mirror 6 and 7 or the mirrors 8 and 9 is nonlinear, so that a cam mechanism (not shown) can be used suitably to shift them in an interlinked fashion.

Figure 2:
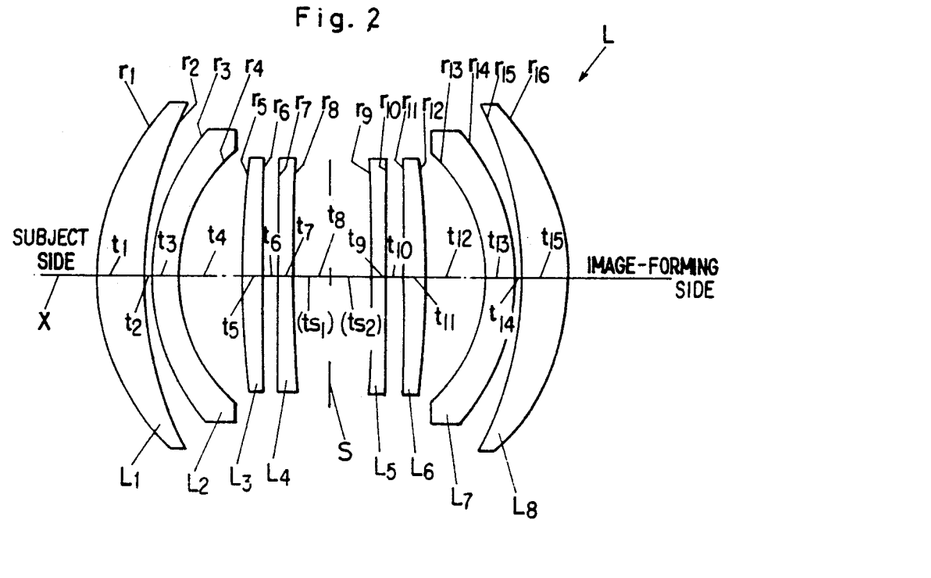
FIG. 2 is a diagrammatic illustration of the construction of a variable magnification duplicator lens system according to the present invention.

The duplicator lens system L consists of eight lens elements $L_1$ to $L_8$ which are located as shown in FIG. 2 when in equivalent scale copy position. More specifically, a group of four lens elements are located on the front side of a stop S (on the side of the original mount surface 1), and a group of similar four lens elements are located on the rear side of the stop S (on the image-forming side or on the side of the sensitive surface 3a). The front lens group is composed of, from the subject side, a 1st lens element $L_1$ consisting of a meniscus lens having positive power and facing the convex side thereof toward the subject, a 2nd lens elements $L_2$ consisting of a meniscus lens having negative power and facing the convex side thereof toward the subject, a 3rd lens element $L_3$ having positive power, and a 4th lens element $L_4$ having negative power. The rear lens group is composed of four similar lens elements $L_5$ to $L_8$ which are arranged symmetrically with the lenses $L_1$ to $L_4$, respectively.

Of the above-mentiond lens elements $L_1$ to $L_8$, the 2nd and 7th lens elements $L_2$ and $L_7$ are fixed, while the lens elements $L_1$, $L_3$ to $L_6$ and $L_8$ are movable within a lens barrel in the direction of the optical axis. The shifts of position of these movable lens elements can be effected by the use of a motor and cam mechanism or the like.

Figure 3:
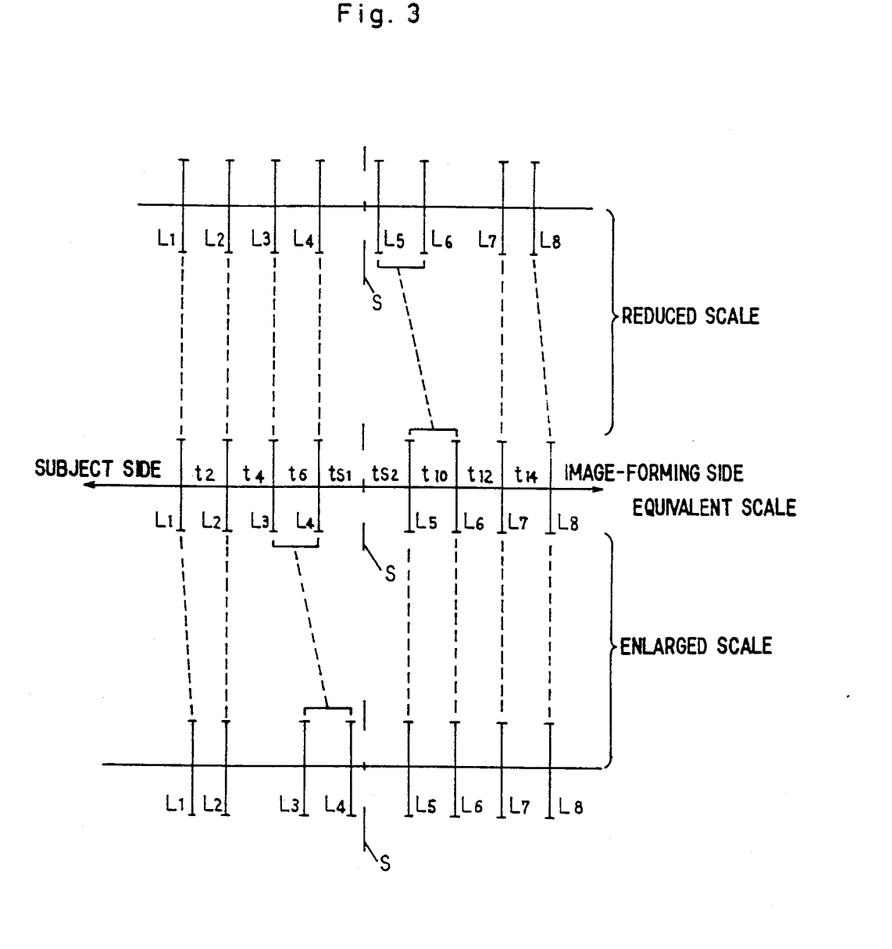
FIG. 3 is a diagram showing the loci of each lens element in shifts to reducing and enlarging scale positions.

The movable lens elements which constitute part of the lens system L are shifted in the direction of the optical axis to correct the aberrations which would be produced in magnified scale positions. In this regard, FIG. 3 shows the loci of each movable lens element in shift from equivalent scale position to enlarged and reduced scale positions.

As clear from this figure, in equivalent scale position, the axial space $t_2$ between the 1st and 2nd lens elements $L_1$ and $L_2$, the axial space $t_4$ between the 2nd and 3rd lens elements $L_2$ and $L_3$, the axial space $t_6$ between the 3rd and 4th lens elements $L_3$ and $L_4$, and the axial space $ts_1$ between the 4th lens element $L_4$ and the stop S have the same length as the axial space $t_{14}$ between the 7th and 8th lens elements $L_7$ and $L_8$, the axial space $t_{12}$ between the 7th and 6th lens elements $L_7$ and $L_6$, the axial space $t_{10}$ between the 6th and 5th the lens elements $L_6$ and $L_5$, and the axial space $ts_2$ between the 5th lens element $L_5$ and the stop S, respectively.

For copying on reduced scale, the lens system L as a whole is shifted toward the image-forming side from the equivalent scale position. Simultaneously, the 8th lens element $L_8$ is shifted toward the 7th lens element $L_7$ to narrow the axial space $t_{14}$ between these elements. As a result, it becomes possible to correct the undercorrective coma aberration which could not be corrected simply by the shift of the lens system itself. On the other hand, in order to straigten the lateral chromatic aberration which would be deteriorated by the variation in length of the axial space $t_{14}$, the 5th and 6th lens elements $L_5$ and $L_6$ are shifted to narrow the axial space $ts_2$ between the 5th lens $L_5$ and the stop S, while broadening the axial space $t_{12}$ between the 6th and 7th lens elements $L_6$ and $L_7$.

For duplication on enlarged scale, the lens system L as a whole is shifted toward the subject from equivalent scale position. At this time, in interlinked relation with the shift of the whole lens system L, the 1st lens element $L_1$ is shifted toward the 2nd lens element $L_2$ to narrow the axial space $t_2$ between these two elements. This rectifies the overcorrective coma aberration in the enlarged scale position, which cannot be straightened out by the shift the entire lens system L alone. Simultaneously therewith, for the purpose of correcting the lateral chromatic aberration resulting from the variation in length of the axial space $t_2$, the 3rd and 4th lens elements $L_3$ and $L_4$ are shifted to narrow the axial space $ts_1$ between the 4th lens element $L_4$ and the stop S and to broaden the axial space $t_4$ between the 3rd and 2nd lens elements $L_3$ and $L_2$.

In this instance, it is preferred that the shifts of the above-described movable lens elements are in the ranges which satisfy the following conditions. Namely, in case of scale reduction:

(1) $-0.00216 \log|m| < (\Delta t)/f < -0.0123 \log|m|$ (2) $-0.0226 \log|m| < (\Delta t_{12})/f < -0.0754 \log|m|$ and in case of scale enlargement:

(3) $-0.0123 \log|m| < (\Delta t)/f < -0.00216 \log|m|$ (4) $0.0226 \log|m| < (\Delta t_4)/f < 0.0754 \log|m|$ wherein f: focal length of the entire system;

m: magnification;

$\Delta t$: $\Delta t_2 - \Delta t_{14}$;

$\Delta t_2$: the variation of axial space $t_2$ based on the length in equivalent scale position;

$\Delta t_4$: the variation of axial space $t_4$ based on the length in equivalent scale position;

$\Delta t_{12}$: the variation of axial space $t_{12}$ based on the length in equivalent scale position;

$\Delta t_{14}$: the variation of axial space $t_{14}$ based on the length in equivalent scale position.

Here, the condition (1) determines the variations $\Delta t_2$ and $\Delta t_{14}$ in reduced scale position. If the value $\Delta t$ becomes greater than the upper limit, the undercorrective coma aberration turns to overcorrection, contrary to the objective of improving the optical performance quality by enhancing the MTF value by about 10% or more as compared with the uncorrected condition, thus failing to achieve the improvement in performance quality by conversely leaving coma aberration in the undercorrected state or increasing undercorrective coma aberration due to inappropriate correction.

The condition (2) is intended for correction of the lateral chromatic aberration which occurs in reduced scale position due to overcorrection on the short wavelength side. If smaller than the lower limit, it becomes difficult to rectify the lateral chromatic aberration on the short wavelength side appropriately by undercorrective rectification. If it exceeds the upper limit, the axial space $ts_1$ between the 4th lens element $L_4$ and the stop S as well as the axial space $ts_2$ between the stop S and the 5th lens element $L_5$ is lengthened, resulting in a lens system L of an undesirably large size as a whole. In addition, the optical performance quality is deteriorated as the depth of focus of the image surface becomes shallower due to overcorrection.

The condition (3) determines the displacements or shifts $\Delta t_2$ and $\Delta t_{14}$ in enlarged scale position. If the value of $\Delta t$ is increased beyond the upper limit, the overcorrective coma aberration is corrected excessively toward the undercorrective side, as a result deteriorating the MFT value. Where it is minimized below the lower limit, the improvement in performance quality cannot be expected since conversely it becomes difficult to straighten the overcorrective coma aberration.

Further, the condition (4) is intended to rectify the undercorrective lateral chromatic aberration which occurs on the short wavelength side in enlarged scale copy position. If it becomes smaller than the lower limit, difficulties are encountered in straightening out the lateral chromatic aberration on the short wavelength side appropriately by undercorrective rectification. Similarly to the situations in reduced scale position, if it is increased beyond the upper limit, the axial spaces $ts_1$ and $ts_2$ are lengthned, necessitating to increase the size of the lens system L as a whole and deteriorating the optical performance quality with an image surface shallower in depth of focus due to undercorrection.

In FIG. 3, $t_{14}$ and $t_2$ are varied in reduced and enlarged copy scale positions, respectively. However, since the value of $\Delta t$ in the above-defined conditions (1) and (2) is $\Delta t_2 - \Delta t_{14}$, it is also possible, in reduced scale position, to make a shift to broaden $t_2$ while holding $t_{14}$ fixed, and, in enlarged scale position, to make a shift to broaden $t_{14}$ while holding $t_2$ fixed. Alternatively, while fixing either one of the axial spaces $t_2$ and $t_{14}$, the other axial spaces may be broadened or narrowed in reduced or enlarged scale position if desired.

Further, it is preferred that in reduced scale position $\Delta ts_2 = -\Delta t_{12}$ and in enlarged scale position $\Delta ts_1 = \Delta t_4$ (where $\Delta ts_1$ is the variation of the axial spaces $ts_1$ from the length in equivalent scale position, and $\Delta ts_2$ is the variation of the axial space $ts_2$ from the length in equivalent scale position). When these conditions are met, the 5th and 6th lens elements $L_5$ and $L_6$ can be shifted without varying the axial space $t_{10}$ therebetween in reduced scale position, permitting to shift these lens elements as an integral part. Besides, the 3rd and 4th lens elements $L_3$ and $L_4$ can be similarly shifted integrally into enlarged scale position by the use of a lens shift mechanism which is simplied as a whole in construction.

| Embodiment | | | |
|---|---|---|---|
| Setting $f = 1.0$ | | | |
| F No = 8.0 ($\infty$), | | | |
| half angle of field = 27.4° (on 1:1 scale), and | | | |
| magnification range = $-0.5x - -2.0x$ | | | |
| $r_1 = 0.17723$ | $t_1 = 0.03477$ | $N_1 = 1.63854$ | $V_1 = 55.5$ |
| $r_2 = 0.26685$ | $t_2 = 0.00436$ | $N_2 = 1.68893$ | $V_2 = 31.1$ |
| $r_3 = 0.16002$ | $t_3 = 0.02045$ | $N_3 = 1.51633$ | $V_3 = 64.1$ |
| $r_4 = 0.12269$ | $t_4 = 0.04681$ | $N_4 = 1.71736$ | $V_4 = 29.5$ |
| $r_5 = 1.15057$ | $t_5 = 0.01477$ | $N_5 = 1.71736$ | $V_5 = 29.5$ |
| $r_6 = 22.72233$ | $t_6 = 0.01136$ | $N_6 = 1.51633$ | $V_6 = 64.1$ |
| $r_7 = \infty$ | $t_7 = 0.01102$ | $N_7 = 1.68893$ | $V_7 = 31.1$ |
| $r_8 = 2.13903$ | $t_8 = 0.05612$ | $N_8 = 1.63854$ | $V_8 = 55.5$ |
| $r_9 = -2.13903$ | $t_9 = 0.01102$ | | |
| $r_{10} = \infty$ | $t_{10} = 0.01136$ | | |
| $r_{11} = -22.72233$ | $t_{11} = 0.01477$ | | |
| $r_{12} = -1.15057$ | $t_{12} = 0.04681$ | | |
| $r_{13} = -0.12269$ | $t_{13} = 0.02045$ | | |
| $r_{14} = -0.16002$ | $t_{14} = 0.00436$ | | |
| $r_{15} = -0.26685$ | $t_{15} = 0.03477$ | | |
| $r_{16} = -0.17723$ | | | |
| where $r_i$ = radius of curvature at position i | | | |
| $t_i$ = axial space at position i | | | |
| $N_i$ = the refractive index for line d at i | | | |
| $v_i$ = Abbe number at position i | | | |
| $ts_1 = 0.02806$ (on 1:1 scale) | | | |
| $ts_2 = 0.02806$ (on 1:1 scale) | | | |

Figure 4:
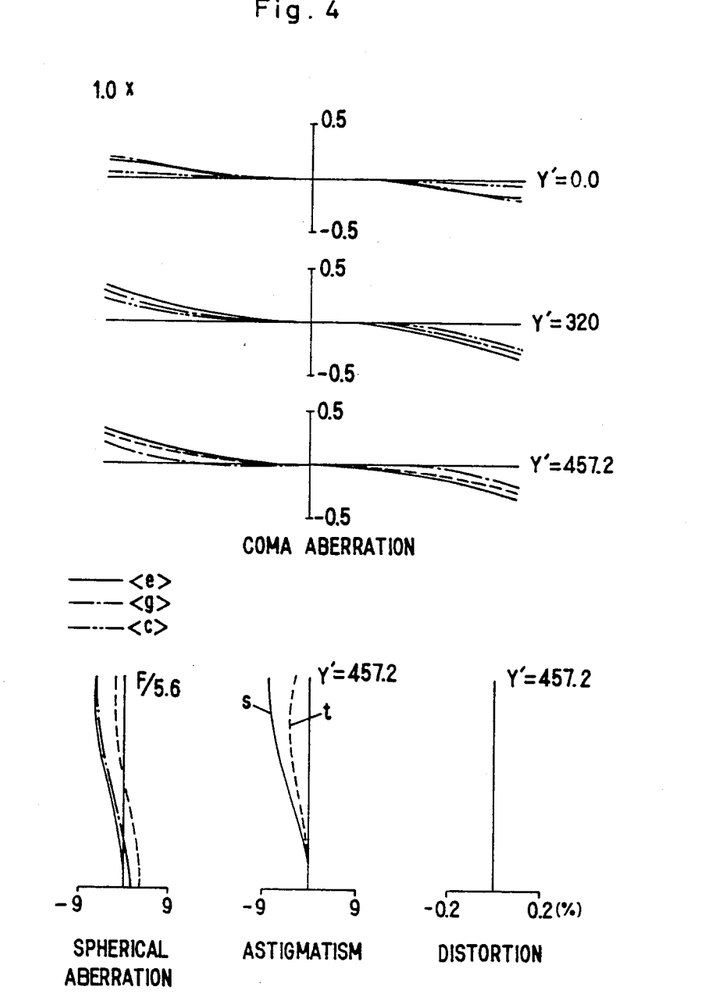
FIGS. 4 to 6 are aberration diagrams of the first embodiment of the invention in magnifying position, to which conditional formulae of the invention are not applied.
Figure 5:
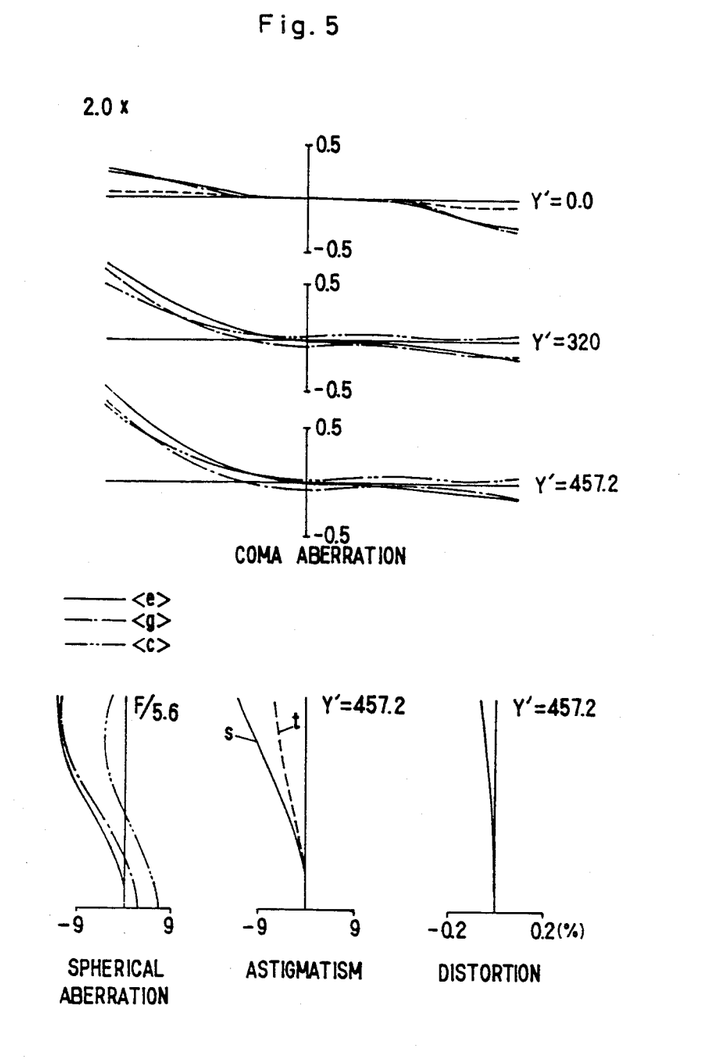
Figure 6:
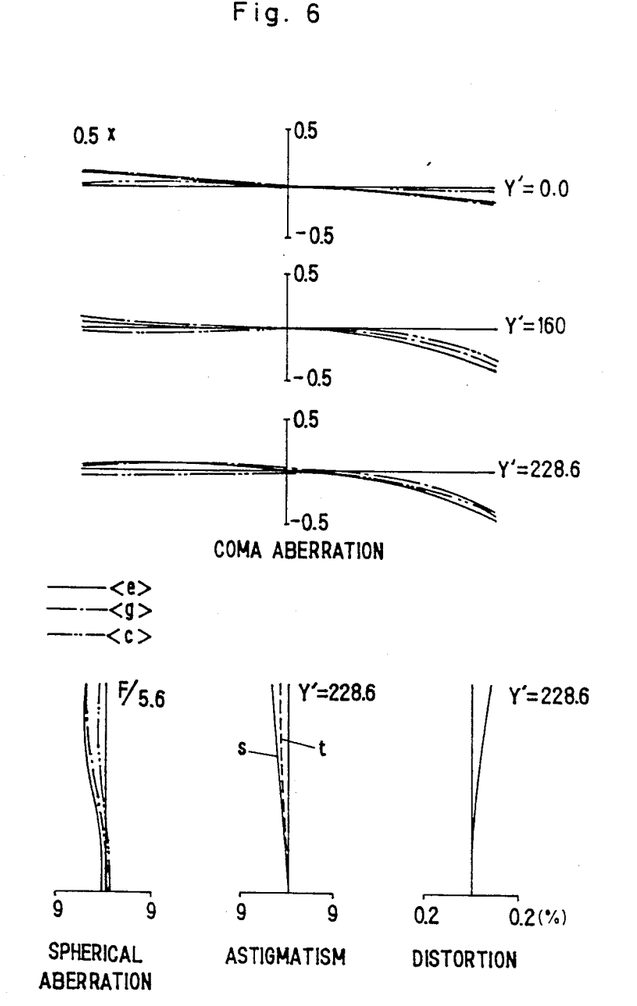

FIGS. 4 to 6 are aberration diagrams in those cases where the above-described embodiment 1 with a focal length set at f=440 mm was shifted to various magnification scale positions without applying the conditional formulas (1) to (4) of the invention, namely, holding the axial space $t_2$, $t_4$, $t_{12}$, $t_{14}$, $ts_1$ and $ts_2$ at the same values as in the equivalent scale position.

FIG. 4 is an aberration diagram in the equivalent scale position, FIG. 5 an aberration diagram in the position where the magnification rate m is $-2.0\times$ and FIG. 6 is an aberration diagram in the position where the magnification rate m is $-0.5\times$.

Figure 7:
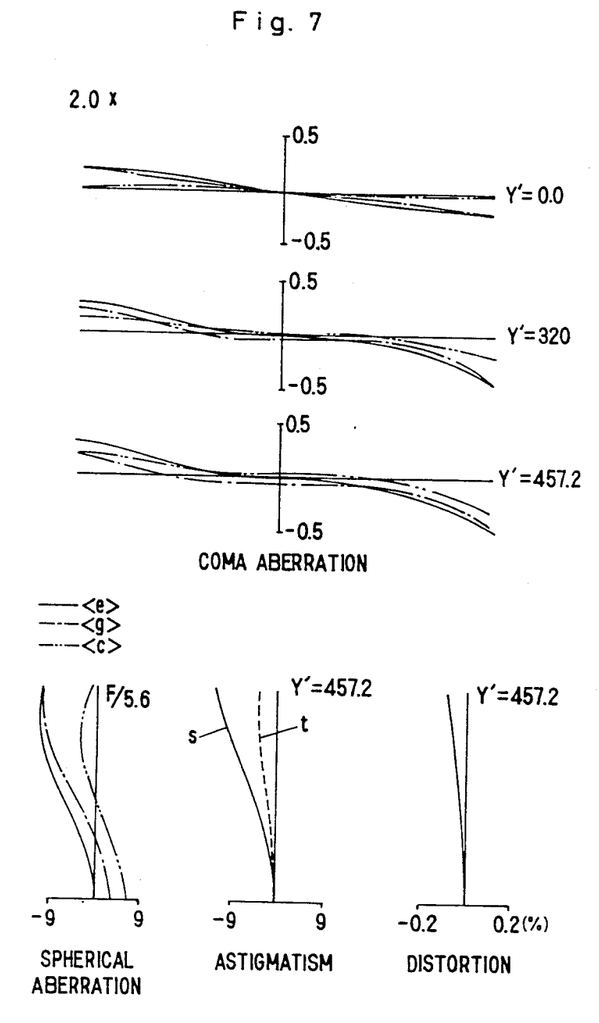
FIGS. 7 to 9 are aberration diagrams of the first embodiment of the invention in magnifying position, to which the conditional formulae of the invention are applied.
Figure 8:
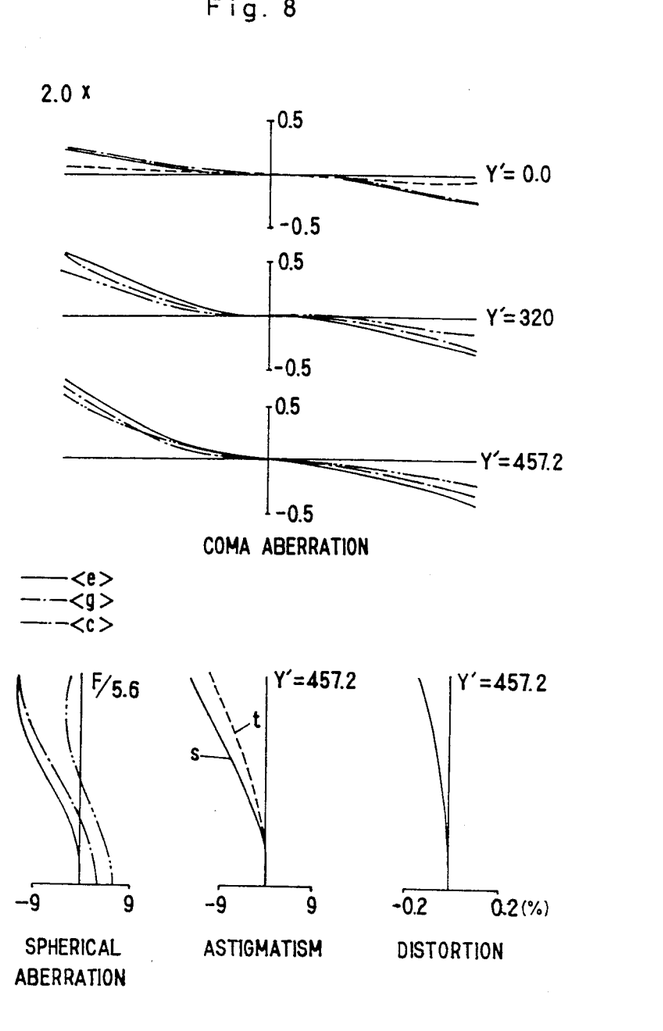
Figure 9:
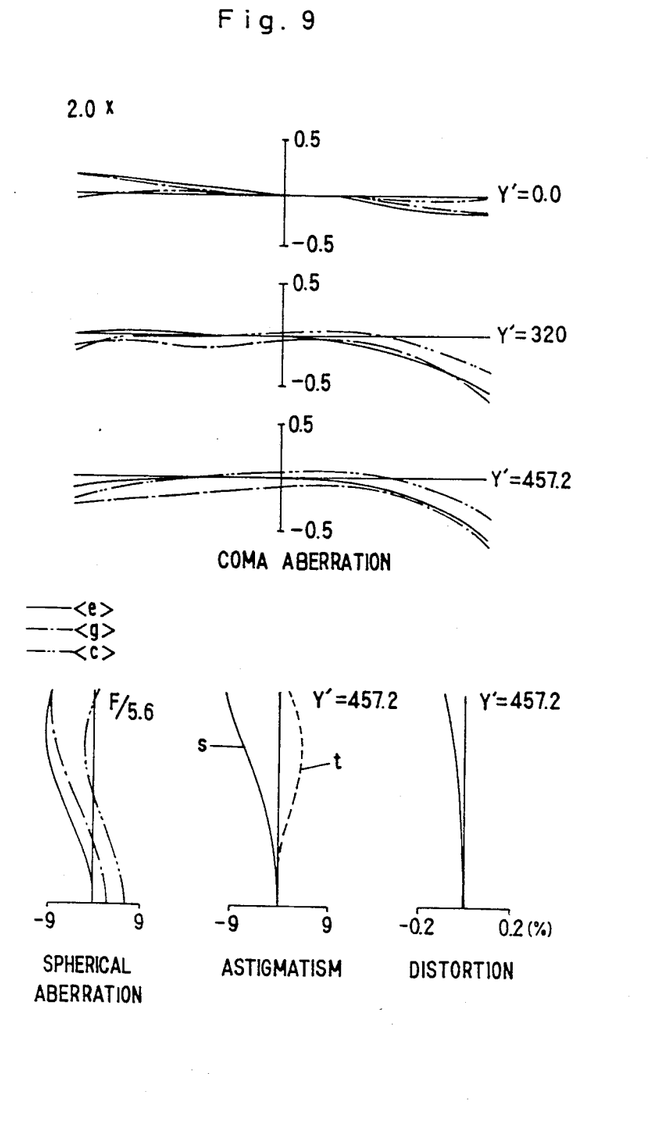

FIGS. 7 to 9 are aberration diagrams in those cases where the above-described embodiment 1 with a focal length set at f=440 mm was shifted to bring the lens system L to the position of a magnification rate $m = -2.0\times$, applying the following values to the conditions (3) and (4).

Namely, FIG. 7 is an aberration diagram of a case where approximately medium values in the ranges of the conditions (3) and (4) were applied as follows.

$\Delta t_2 = -0.00217645$
$\Delta t_{14} = 0.0$
$\Delta t = -0.00217645$
$\Delta t_4 = 0.01475$
$\Delta ts_1 = -0.1475$ FIG. 8 is an aberration diagram of a case where the upper limit values of the conditions (3) and (4) were applied.

$\Delta t_2 = -0.00065022$
$\Delta t_{14} = 0.0$
$\Delta t = -0.00065022$
$\Delta t_4 = 0.022697$
$\Delta ts_1 = -0.022697$ FIG. 9 is an aberration diagram of a case where the lower limit values of the conditions (3) and (4) were applied.

Figure 10:
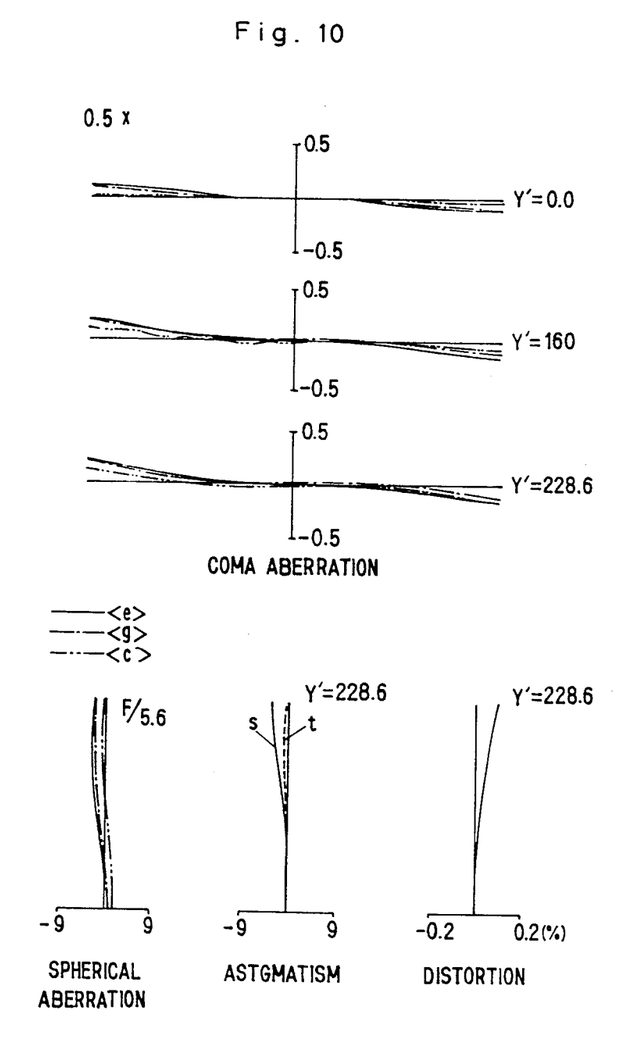
FIGS. 10 to 12 are aberration diagrams in a case where the conditional formulae of the invention are applied and the magnification rate $m = -0.5 \times$.
Figure 11:
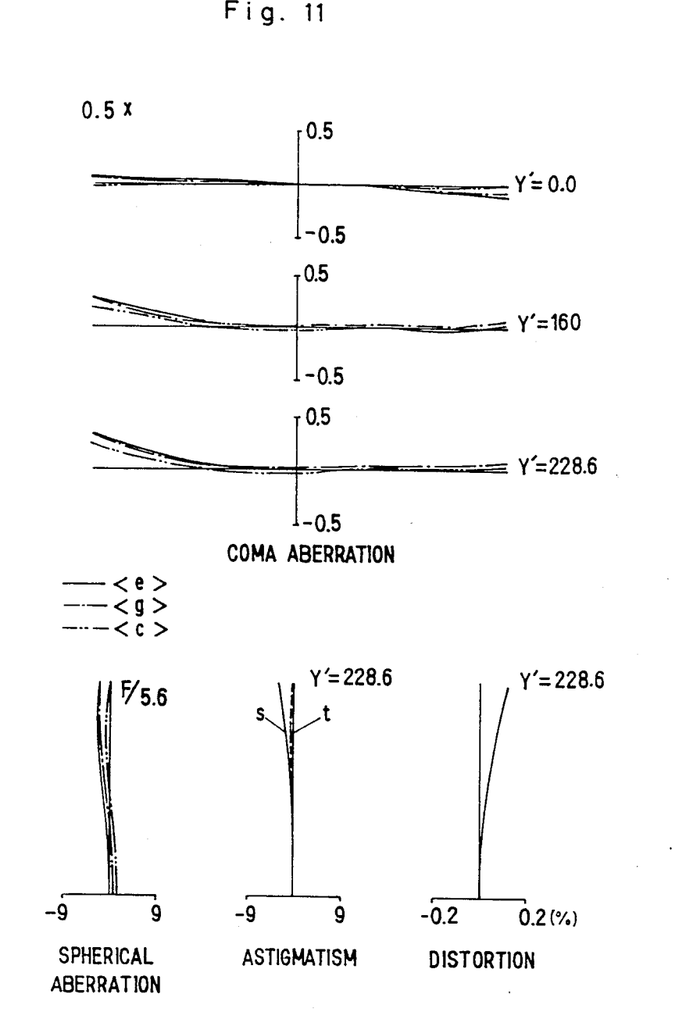
Figure 12:
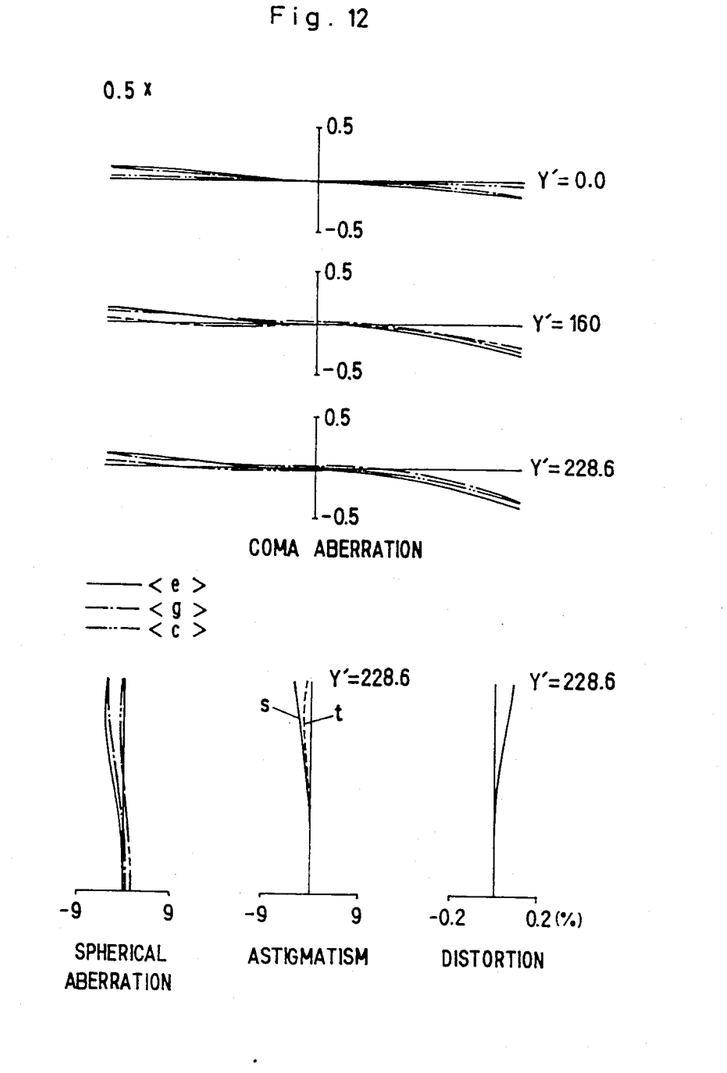

$\Delta t_2 = -0.00370267$
$\Delta t_{14} = 0.0$
$\Delta t = -0.00370267$
$\Delta t_4 = 0.006803$
$\Delta ts_1 = -0.006803$ FIG. 10 to 12 are aberration diagrams in those cases where the above-described embodiment 1 with a focal length f set at 440 mm was shifted to bring the lens system L to the position of a magnification rate $m = -0.5\times$, applying the following values to the conditions (1) and (2).

Namely, FIG. 10 is an aberration diagram of a case where approximately medium values in the ranges of the conditions (1) and (2) were applied as follows.

$\Delta t_2 = 0.0$
$\Delta t_{14} = -0.00217645$
$\Delta t = 0.00217645$
$\Delta t_{12} = 0.01475$
$\Delta ts_2 = -0.01475$ FIG. 11 is an aberration diagram of a case where the upper limit values of the conditions (1) and (2) were applied.

$\Delta t_2 = 0.0$
$\Delta t_{14} = -0.00370267$
$\Delta t = 0.00370267$
$\Delta t_{12} = 0.022697$
$\Delta ts_2 = -0.022697$ FIG. 12 is an aberration diagram of a case where the lower limit values of the conditions (1) and (2) were applied.

$\Delta t_2 = 0.0$
$\Delta t_{14} = -0.00065022$
$\Delta t = 0.00065022$
$\Delta t_{12} = 0.006803$
$\Delta ts_2 = -0.006803$ It will be seen that the magnification coma aberrations of FIGS. 7 to 12 according to the present invention are improved as compared with the magnification coma aberrations of FIGS. 5 and 6 to which the invention is not applied. As clear from these figures, the improvement of coma aberrations imposes no adverse effects on the spherical aberration, astigmatism and distorsion or the like.

It will be appreciated from the foregoing detailed description that, in accordance with the present invention, it becomes possible to satisfy the aforementioned requirements for duplicator lens system over a wide magnification range by using a fixed focus lens system instead of a zoom lens, providing a high performance quality lens of wide field angle.

The afore-mentioned conditions according to the invention determine the optimum ranges of the optical performance quality for magnified scale positions. In this connection, it is to be understood that the invention includes the optical systems which apply the conditional formulas to a particular magnification range to suit a particular design of mechanism.

What is claimed is:

1. A variable magnification duplicator lens system which comprises:

a couple of lens groups each consisting of four lens elements and located on the opposite sides of a stop, one on a subject side and the other on an image-forming side;

said lens elements of the lens group on the subject side of the stop including a 1st lens consisting of a meniscus lens of positive power facing the convex side thereof toward the subject, a 2nd lens consisting of a meniscus lens of negative power facing the convex side thereof toward the subject, a 3rd lens of positive power and a 4th lens of negative power;

said lens elements of the lens group on the image-forming side including a 5th, 6th, 7th and 8th lens elements arranged symmetrically with said 1st, 2nd, 3rd and 4th lens elements on the subject side;

of said lens elements, said 3rd, 4th, 5th and 6th lens elements as well as at least one of said 1st and 8th lens elements being movable;

said lens system being movable in the direction of the optical axis for a change of copy scale;

said lens system being set in reduced scale position by either a lens position adjustment shifting said 5th and 6th lens elements into positions closer to said stop and shifting said 8th lens element closer to said stop and shifting said 8th lens element closer to 7th lens element, or a lens position adjustment shifting said 1st lens element away from said 2nd lens element; and said lens system being set in an enlarged scale position by either a lens position adjustment shifting said 3rd and 4th lens elements into positions closer to said stop and shifting said 1st lens element closer to said 2nd lens element, or a lens position adjustment shifting said 8th lens element away from said 7th lens element;

2. The variable magnification duplicator lens system of claim 1, wherein the shift of said 3rd and 4th lens elements and the shift of said 5th and 6th lens elements are effected in an interlinked fashion.

3. The variable magnification duplicator lens system of claim 1 or 2, wherein said 8th lens element is shifted toward said 7th lens element in said reduced scale position, and said 1st lens element is shifted toward said 2nd lens element in said enlarged scale position.

4. The variable magnification duplicator lens system of claim 1 or 2 wherein, in the reduced scale position at least either the axial space $t_2$ between said 1st and 2nd lens elements or the axial space $t_{14}$ between said 7th and 8th lens elements, the axial space $t_{s2}$ between said stop and the 5th lens element and the axial space $t_{12}$ between said 6th and 7th lens elements are varied to satisfy the conditions of $$-0.00216 \log|m| < \frac{\Delta t}{f} < -0.0123 \log|m|$$
$$-0.0226 \log|m| < \frac{\Delta t_{12}}{f} < -0.0754 \log|m|$$

and in the enlarged scale position at least either the axial space $t_2$ between said 1st and 2nd lens elements or the space $t_{14}$ between said 7th and 8th lens elements, the axial space $t_4$ between said 2nd and 3rd lens elements and the axial space $t_{s1}$ between said 4th lens element and said stop are varied to satisfy the conditions of $$-0.0123 \log|m| < \frac{\Delta t}{f} < -0.00216 \log|m|$$

wherein f: focal length of the entire system;
m: magnification
$\Delta t$: $\Delta t_2 - \Delta t_{14}$;
$\Delta t_2$: the variation of axial space $t_2$ from the length in equivalent scale position;
$\Delta t_4$: the variation of axial space $t_4$ from the length in equivalent scale position;
$\Delta t_{12}$: the variation of axial space $t_{12}$ from the length in equivalent scale position;
$\Delta t_{14}$: the variation of axial space $t_{14}$ from the length in equivalent scale position.

5. The variable magnification duplicator lens system of claim 4, wherein said lens elements are shiftable to hold $\Delta t_{s2} = -\Delta t_{12}$ in the reduced scale and hold $\Delta t_{s1} = -\Delta t_4$ (where $\Delta t_{s1}$ is the variation of the axial interval $t_{s1}$ based on the length in the equivalent scale position, and $\Delta t_{s2}$ is the variation of the axial space $t_{s2}$ based on the length in the equivalent scale position).

* * * * *